Figure 1:
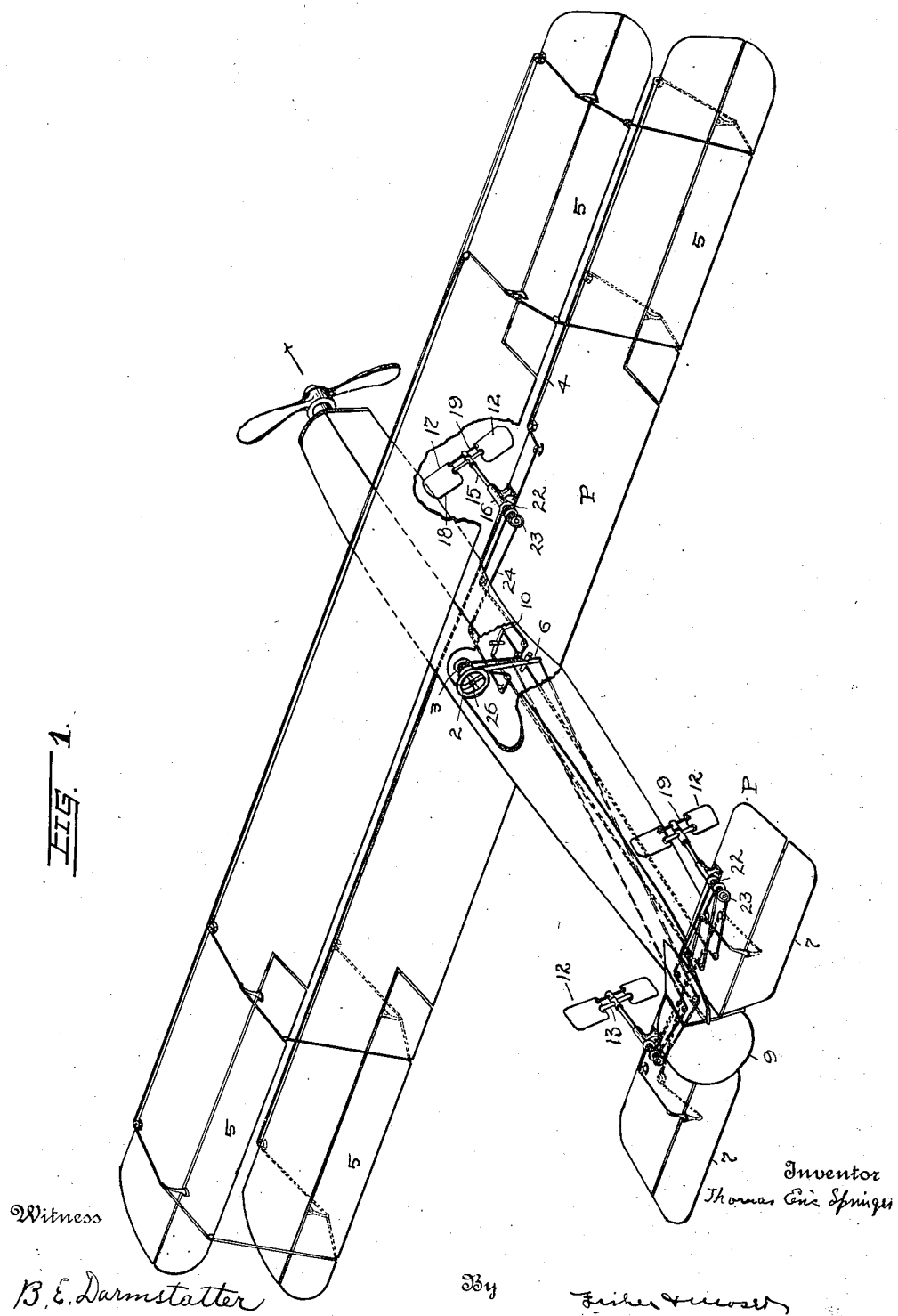

T. E. SPRINGER.
POWER CONTROL FOR AIRSHIPS.
APPLICATION FILED AUG. 17, 1918.
1,412,262. Patented Apr. 11, 1922.
3 SHEETS—SHEET 2.
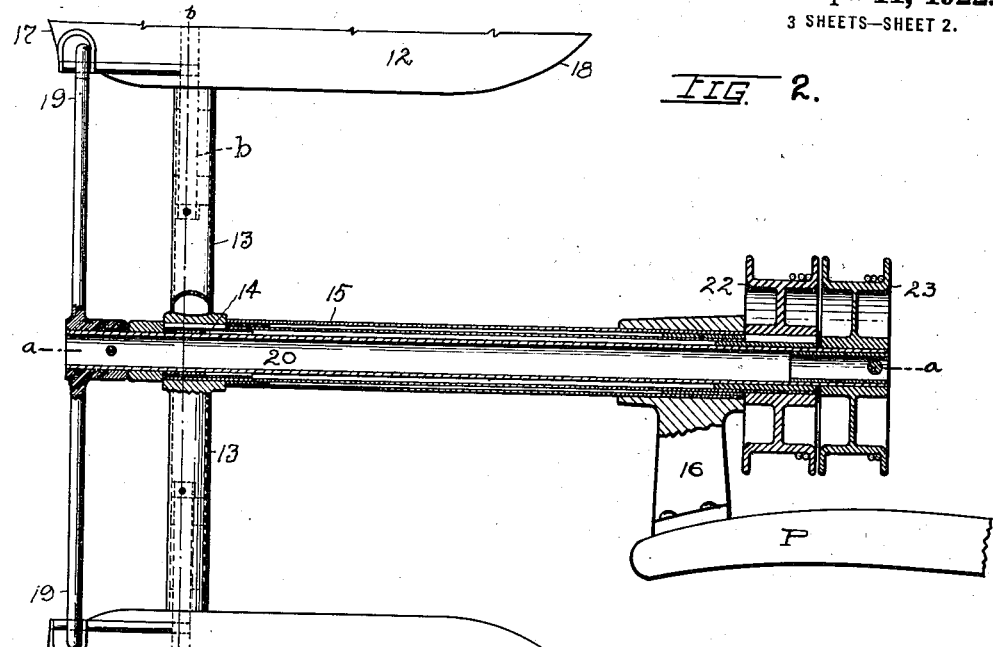
FIG. 2.
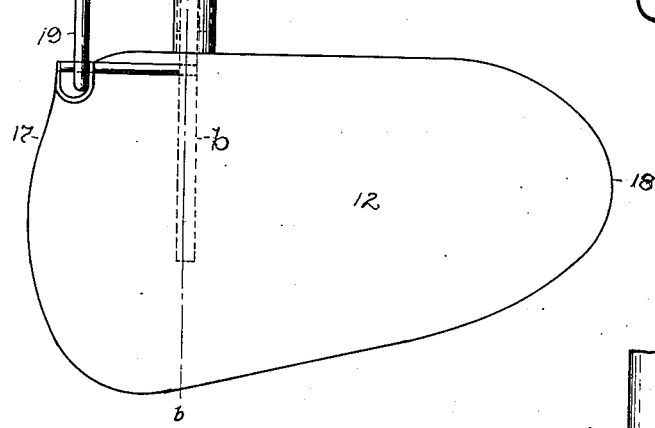
FIG. 3
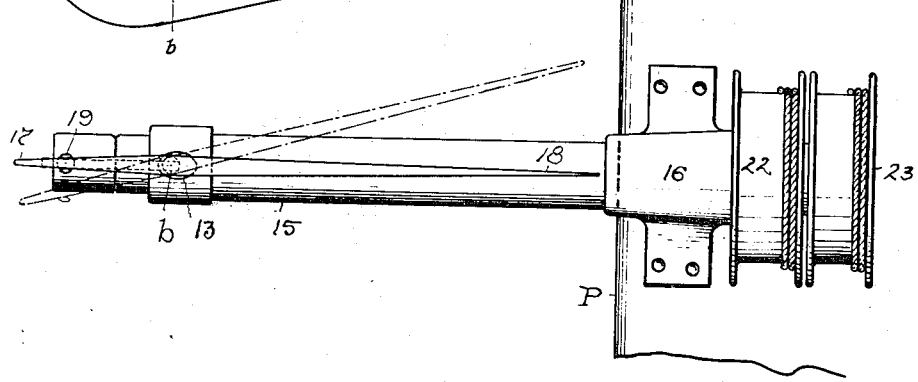

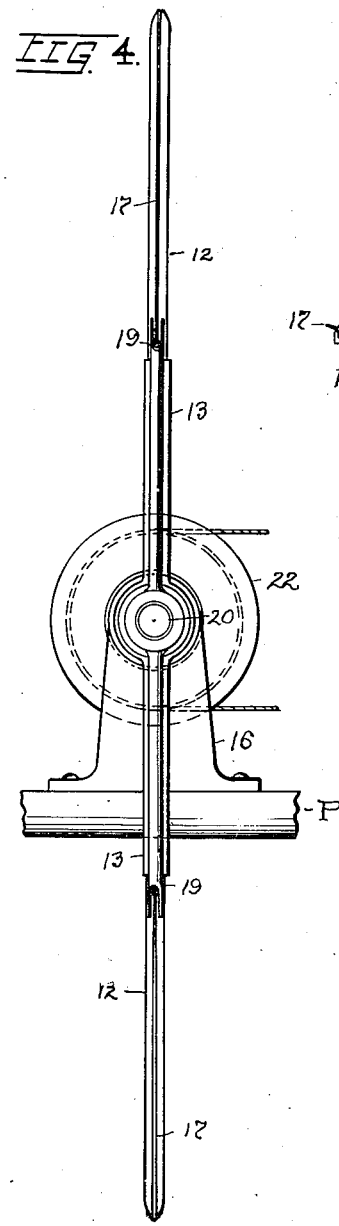
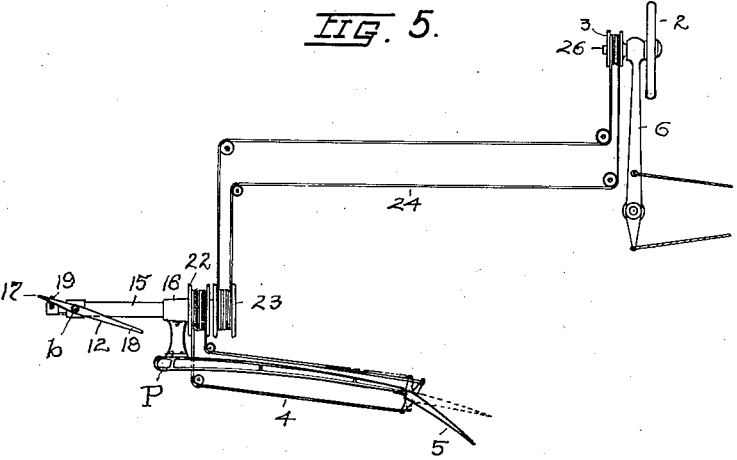
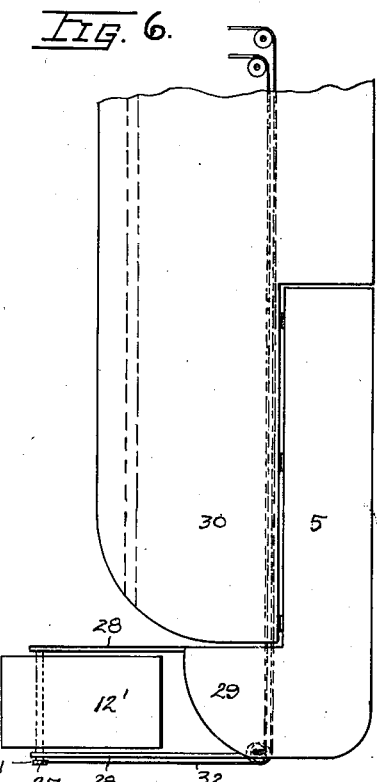
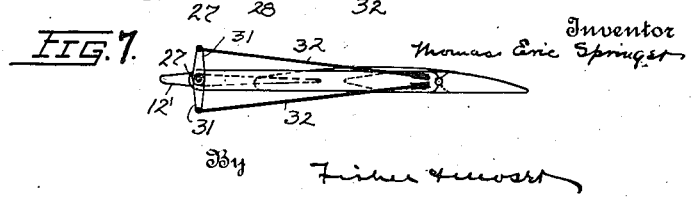

UNITED STATES PATENT OFFICE.

THOMAS ERIC SPRINGER, OF CLEVELAND, OHIO.

POWER CONTROL FOR AIRSHIPS.

1,412,262.  Specification of Letters Patent.  Patented Apr. 11, 1922.

Application filed August 17, 1918. Serial No. 250,287.

*To all whom it may concern:*

Be it known that THOMAS ERIC SPRINGER, a citizen of the United States, residing at Cleveland, in the county of Cuyahoga and State of Ohio, has invented certain new and useful Improvements in Power Control for Airships, of which the following is a specification.

This invention comprises a simple and reliable means for operating the control surfaces of an airship by power derived from the flight of the ship through the air, and the primary object of the invention is to relieve the pilot of the ship from heavy manual labor in guiding and controlling the flight of the ship while still placing him in direct manual touch with the control surfaces so that the pressure thereon and any movements thereof may be immediately noted and any variation promptly met. The invention is not limited to any particular size of airship, but it is of especial utility in airships having relatively large areas of control surfaces where the manual power to operate such surfaces would be too greatly taxed or where the requirements absolutely demand mechanical power to operate the control surfaces. Heretofore, the general practice has been to operate the control surfaces either entirely by manual power or by power derived from the engine driving the propeller shaft of the ship. In this invention the main control surfaces of the airship are operated by auxiliary air surfaces or planes which augment the power applied manually by the pilot in guiding and controlling the flight of the ship. The pilot merely applies a nominal amount of power which is compounded automatically by the auxiliary air surfaces while the pilot is in constant and sensitive touch with his hands and feet with the air forces at work upon the control surfaces. The control surfaces referred to may be either the rudder, elevators, or the ailerons of the airship, or all three together, and the preferred way is to provide each of the control surfaces named, with an auxiliary operating means such as hereinafter shown and described and more particularly pointed out in the claims.

In the accompanying drawing, Fig. 1 is a diagrammatic view in perspective of an aeroplane equipped with the invention. Fig. 2 is an enlarged view of the auxiliary power device, showing the tubular shafts and the sheaves thereon in section. Fig. 3 is an elevation of the auxiliary power device showing an edge view of the operating plane in a neutral position in full lines and in a turned position in dotted lines. Fig. 4 is a front view of the auxiliary device as it is seen from the direction of flight of the airship. Fig. 5 is a diagrammatical view showing the auxiliary power device in connection with the steering wheel and one of the ailerons of an aeroplane. Fig. 6 is a plan view of a modification of the invention, and Fig. 7 is an edge view of the same parts.

The invention involves the use of hand and foot control elements such as used heretofore in aeroplanes, for example, a steering wheel 2 having a reel or sheave 3 for winding and unwinding a set of cables by means of which the ailerons 5 are controlled. This steering wheel in some types of machines is substituted by a lever, and it is also common to mount a wheel of this kind on a post 6 pivoted at a point intermediate its ends so as to provide a lever movement adapted to control the elevators or elevating planes 7 by suitable cables connected with this pivoted post, and the rudder 9 of the airship is also under the control of the pilot, one means of rudder control in use being by a foot lever 10 pivoted at its middle and connected to the rudder arms by suitable cables. Whether such control elements as described or their equivalents are provided, it is the intent herein to utilize the same to operate auxiliary air control surfaces or planes 12 in a way best adapted to augment the manual power of the pilot in operating the main control surfaces. Thus, the flight of the airship is utilized to turn a set of auxiliary control surfaces or planes 12 about a horizontal axis $a$—$a$ subsequent to a turning movement of such surfaces 12 into the wind by the manual power of the pilot. The auxiliary surfaces 12 are small planes mounted on posts $b$ which have rotatable bearing in tubular arms 13 affixed to a tubular shaft 14 which is free to rotate in an extended bearing tube 15 held by a bracket or standard 16 secured in an upright position on the main planes or any part of the aeroplane. As shown herein the bracket is mounted on the fixed planes P of the aeroplane with the axis of the shaft 14 extending parallel to the direction of flight and with the shorter ends 17 of the auxiliary surfaces or planes 12 pointing toward the direction of flight and the longer ends 18 in a trailing relation to their supporting posts b. By turning these auxiliary planes on their own axes the surfaces thereof are presented at an angle to the wind and the shaft 14 rotated, and any number of these small planes may be used. The means for turning each set of planes to the same angle comprise forked arms 19 extending radially from the front end of an inner tubular shaft 20 which is free to turn within the sleeve or shaft 14. The forked ends of arms 19 engage the short ends 17 of the auxiliary small planes at a point relatively near their posts or axes b, and only a slight movement is necessary to set the planes at the angle required to effect a turning movement of the tubular shaft 14. Turning the planes on their own axes requires only sufficient manual power to overcome the pressure of the wind on these relatively small surfaces, and the center of pressure is to the rear of the posts or axes b. But, inasmuch as these planes are mounted on the floating or free-revolving shaft 14, the immediate result is that the wind pressure will rotate the shaft until the post or axis b is again in parallel or approximately parallel alignment with the forked arm 19, assuming that said arm is being held in a stationary position by the control devices in the hand of the pilot. On the other hand, if the pilot continues to rotate the inner shaft and the arm 19 to turn the auxiliary planes, the pressure of the wind continues to act and augment his power upon the auxiliary plane to rotate shaft 14. However, the moment the arms 19 come to a rest position the auxiliary planes will advance to a neutral or balanced position. In this way, the wind pressure on the auxiliary planes augments the manual power of the operator in turning the outer shaft 14 and a sheave 22 thereon, around which a cable is wound. This cable has its opposite ends connected to the control planes of the aeroplane, for example, to the aileron, rudder or the elevator. The inner shaft 20 also has a sheave 23 with a cable 24 wound around the same and the ends of this cable are connected to the controlling device in the hands of the operator. Thus, the ends of cable 24 may pass around suitable idler pulleys and over and around the wheel 3 mounted on the steering wheel shaft 26, and which shaft may be rotated in either direction by the steering wheel 2 and thereby cause the rotation of the inner tubular shaft 20, which in turn will operate the forked arms and the auxiliary surfaces or planes. The pressure of the wind is then brought into action to rotate the outer shaft 14 and its sheave 22 in the same direction as the inner shaft and its sheave 23, and the cable connection 4 with the ailerons moves the ailerons correspondingly. The power applied by the pilot is not only augmented by the wind acting upon the small planes at the center of pressure, which is at the rear of posts b, but the arrangement of the sheaves and the leverages obtained by the placement of the planes more or less remotely from the horizontal axis a—a also serve to compound the power so as to make it easier for the pilot to operate and control the main control surfaces, meaning the ailerons, elevators and rudders.

While the connecting means between the steering mechanism and the auxiliary power device is shown herein as comprising sheaves and cables it is not intended to limit the invention to the use of cables and sheaves, especially as any mechanical equivalent may be used to transmit power from part to part. For example, rack and gear mechanism may be used in lieu of the sheaves. I may also mount the auxiliary planes directly upon the main control planes as illustrated in Figs. 6 and 7. Thus, the auxiliary plane 12' shown in these figures has a shaft 27 adapted to turn in a pair of arms 28 which extend forwardly from the tip portion 29 of the aileron 5 hinged to the main plane 30. Shaft 27 has a pair of oppositely-extending arms 31 to which the control cables 32 are connected, and these cables extend to the control lever or wheel 3 in the hands of the pilot.

What I claim is:—

1. In an airship, power operating means for the main control surfaces, comprising a rotatable shaft having planes mounted thereon and adapted to turn at an inclination to the axis of said shaft, a second shaft sleeved within said first shaft having rigid means to turn said planes at an angle to the direction of flight, flexible means adapted to rotate said second shaft from the pilot's seat, and flexible operating connection between said first shaft and the main control surfaces.

2. In an airship, a main control surface, an auxiliary control surface having operating means adapted to shift said main control surface comprising a rotatable shaft operatively engaged by said auxiliary control surface, and a manually operable device having a cable connection and means working conjointly to turn said auxiliary control surface.

3. In an airship, a pivoted main control surface and means to turn said surface, comprising a rotatable shaft, a pivoted auxiliary control surface and means mounted upon said shaft having cable connections with said main control surface, and a manually-operable device mounted upon the air-ship having a cable connection and means adapted to rotate said shaft.

4. In an airship, a main control surface for guiding the ship, manually operable means for controlling the position of said main surface comprising a rotatable shaft, in combination with an auxiliary power device in actuating relations with said control surfaces, comprising movable planes mounted on a rotatable shaft supported on said main surface, cable connections between said shaft and said manually operable means, and a second rotatable shaft having cable connection with said control surface.

5. In an airship, a movable control surface and a manually operable device located at the pilot's seat, in combination with auxiliary power means having separate cable connection with both said movable control surface and said device respectively, said means comprising a pair of independently rotatable shafts, one carrying planes adapted to turn on axes transversely disposed to the shaft axis, and the other having rigid arms engaging one end of said planes to turn the same.

6. In an airship, a movable main control surface and an auxiliary control surface in operating connection therewith, in combination with a manually-operable device, two shafts rotatable one within the other supporting said surfaces respectively, separate sheaves on said shafts corresponding to said surfaces, and separate cables connected with each sheave and the main control surface and with said manually operable device, respectively.

Signed at Cleveland, in the county of Cuyahoga and State of Ohio, this 10th day of August, 1918.

THOMAS ERIC SPRINGER.